United States Patent [19]

F'Geppert

[11] Patent Number: 4,502,571
[45] Date of Patent: Mar. 5, 1985

[54] ROD LOCK MECHANISM

[75] Inventor: Erwin F'Geppert, Oakland, Mich.

[73] Assignee: The United States of America as represented by the Secretary of the Army, Washington, D.C.

[21] Appl. No.: 444,556

[22] Filed: Nov. 26, 1982

[51] Int. Cl.³ ............................................ B65H 59/10
[52] U.S. Cl. ........................................ 188/67; 74/531
[58] Field of Search .................... 188/67, 83; 74/531, 74/18; 92/27, 28; 226/97, 147, 151, 149, 150

[56] References Cited

U.S. PATENT DOCUMENTS

| | | | |
|---|---|---|---|
| 1,800,578 | 4/1931 | Webb | 74/18 |
| 2,123,004 | 7/1938 | Farkas | 74/18 |
| 2,596,772 | 5/1952 | Hawkes | 188/67 |
| 2,811,192 | 10/1957 | Kradoska | 188/67 |
| 3,575,087 | 4/1971 | Sherwood | 188/67 |
| 3,695,144 | 10/1972 | Goiffon et al. | 188/67 |

FOREIGN PATENT DOCUMENTS 1132053 10/1968 United Kingdom .................. 188/67

OTHER PUBLICATIONS

IBM Bulletin, vol. II, No. 5, 10–1968.

Primary Examiner—Bruce H. Stoner, Jr.
Assistant Examiner—Alvin Oberley
Attorney, Agent, or Firm—Peter A. Taucher; John E. McRae; Robert P. Gibson

[57] ABSTRACT

Fluid pressure mechanism for locking a movable rod or similar member in selected positions of adjustment. The mechanism includes a fluid housing having at least one annular rod-gripper element encircling a movable rod. Introduction of fluid pressure into the housing causes the gripper element to expand out of locking engagement with the rod. Removal of the fluid pressure force enables the gripper element to relax into locking engagement with the rod. In a preferred arrangement two rod-gripper elements are employed. The rod passes through the two gripper elements located in opposite side walls of the housing.

1 Claim, 5 Drawing Figures

ROD LOCK MECHANISM

GOVERNMENT INTEREST

The invention described herein may be manufactured, used, and licensed by or for the Government for governmental purposes without payment to me of any royalty thereon.

BACKGROUND AND SUMMARY

This invention relates to mechanism for locking a linearly movable rod in selected positions of adjustment. The rod may be an inflexible rigid member, such as a piston rod, control rod, shaft, strut or leg structure. Alternatively, the rod can be a flexible member such as a cable, rope, hose, or wire.

Usually the rod will have a circular cross section, although other cross sections are possible, such as square, rectangular triangular, or hexagonal. The term "movable rod" will be used herein to include a flexible or inflexible elongated member movable in the direction of its axis.

In one embodiment of the invention the movable rod extends through a housing that has two annular elastomeric members encircling the rod outer surface. The annular elastomeric members are initially formed with internal drameters less than the outer diameter of the rod. In their normal relaxed states the elastomeric members frictionally grip the outer surface of the rod to prevent rod movement. The support housing communicates with a compressed air source so that when a control valve is opened to admit compressed air into the housing the increased pressure within the housing acts against the elastomeric members to expand the members away from the rod surface, thereby enabling the rod to be moved relative to the housing. In an absolute sense the housing may be stationary and the rod movable, or the housing may be movable and the rod stationary. In either case the rod has movement relative to the housing.

A general object of the invention is to provide a rod locking mechanism that can be remotely actuated. Another object is to provide a rod locking mechanism that can be manufactured at relatively low cost.

THE DRAWINGS

Figure 1:
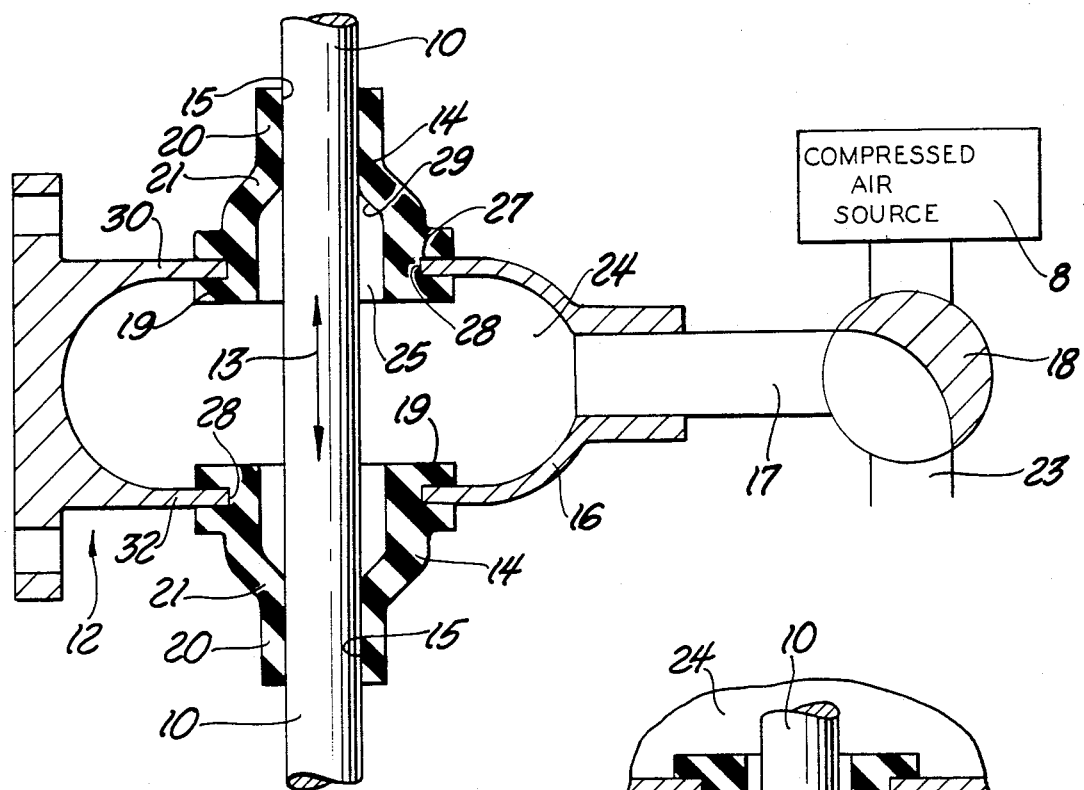
FIG. 1 is a sectional view taken through one embodiment of the invention.

Referring in greater detail to FIG. 1, there is shown a mechanism 12 for locking a rod 10 in selected positions of adjustment. Power means, not shown, moves the rod in either or both of the directions indicated by arrows 13. The lock mechanism comprises a stationary housing 16 connected to a conduit 17 that leads from a three-way valve 18 associated with a compressed air source 8. In the illustrated position of valve 18 housing 16 is isolated from source 8, and housing 16 pressure is vented through a valve port 23 to the atmosphere. Clockwise motion of the valve causes housing 22 to communicate with compressed air source 8, thereby pressurizing housing chamber 24.

Mounted in housing walls 30 and 32 are two similarly-constructed rod-gripper means 14. Each gripper means comprises an elastomeric annular member that includes a relatively large diameter plug section 19, tapered neck section 21, and relatively small diameter sleeve section 20. Plug section 19 has an endless groove 27 in its outer surface which fits over or around the edge of an opening 28 in the housing wall, thus rigidly mounting the elastomeric member on the housing. The inner diameter of plug section 19 is appreciably greater than the rod 10 diameter so that when housing space 24 is pressurized the pressure enters annular space 25 and thereby expands plug section 19 radially against the edge of wall opening 28, thus preventing the pressure from blowing the elastomeric member out of its mounted position on the housing.

Figure 2:
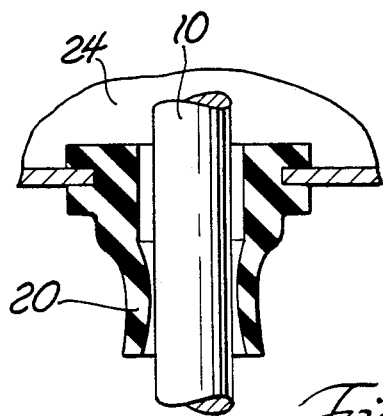
FIGS. 2 and 3 are sectional views of components used in the FIG. 1 embodiment, taken under different operational conditions.
Figure 3:
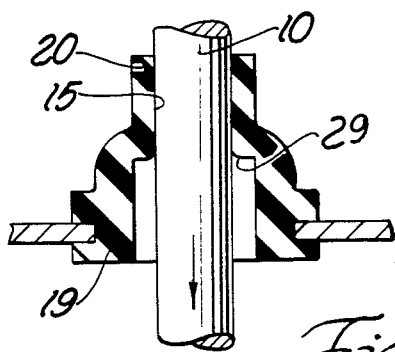

Each sleeve section 20 is initially formed so that its inner diameter is less than the rod 10 diameter. Therefore, when housing 16 is in a depressurized condition (normal atmospheric pressure in chamber 24) both sleeves will grip the rod to prevent rod motion. Should the rod be moving downwardly when housing 16 is initially depressurized the internal surface 29 on the upper sleeve may be slightly bulged against the rod surface, as shown in FIG. 3. If the rod happened to be moving upwardly when housing 16 was initially depressurized the corresponding internal surface on the lower sleeve would exert the bulge action depicted in FIG. 3; bulge action is affected by the elastomer durometer. In any case both sleeves grip the rod. When housing 16 is internally pressurized both elastomeric sleeves are released from the rod, as shown in FIG. 2.

Figure 4:
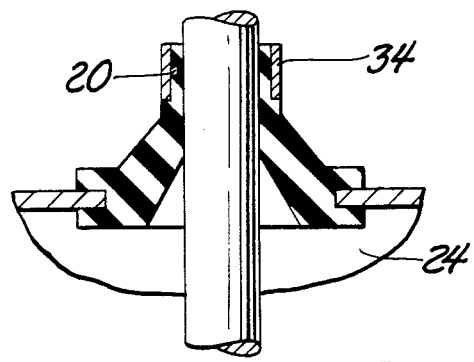
FIGS. 4 and 5 are sectional views of components used in two other embodiments of the invention.

FIG. 4 illustrates a variation of the invention wherein the locking action is augmented by an external spring band 34 encircling sleeve 20. The band extends almost completely around the sleeve, but is cut through at one point to permit band expansion when the housing chamber 24 is pressurized. Spring band 34 is preformed to exert an inward sleeve-compressing action. Use of the band may be advantageous in preventing the formation of stress cracks or slits in the elastomer incident to sudden pressurization of chamber 24. Band 34 has a sleeve-reinforcement action.

Figure 5:
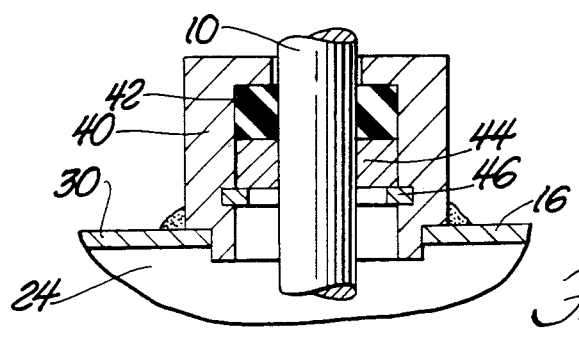

FIG. 5 fragmentarily shows a form of the invention wherein the rod is locked by pressurization of chamber 24 (rather than being unlocked). In this case the individual rod gripper means comprises a cup-shaped cylinder structure 40 containing an annular elastomeric gripper element 42; the inner diameter of element 42 is the same or slightly greater than the rod 10 diameter, so that when chamber 24 is depressurized the rod can move freely in the arrow 13 directions. An annular piston 44 is slidably disposed within cylinder 40, whereby pressurization of chamber 24 causes the piston to exert an axial force on the elastomeric element. The axial force translates into an inward radial frictional lock action of element 42 on the rod 10 surface. A retainer ring 46 prevents excessive movement of piston 44 into chamber 24 when the chamber is depressurized. Housing 16 would be equipped with two assemblies of the type shown in FIG. 4.

The illustrated lock structures are designed primarily for use with rods that move axially in linear fashion. The structures could however be used with rods that move rotationally. The description of the drawings has proceeded on the basis that housing 16 is stationary in an absolute sense and rod 10 is movable in an absolute sense. It will be understood however that the housing could be movable and the rod stationary, e.g. when rod 10 is a stationary guide rod or rail support for a movable structure that includes housing 16.

In practice of my invention the lock or unlock action is triggered by valve 18. The valve could be a manual valve. However it could also be electrically operated, either with a solenoid or an electric motor. Electric valve operation permits remote actuation of the lock action, a very desirable feature in many situations I wish it to be understood that I do not desire to be limited to the exact details of construction shown and described for obvious modifications will occur to a person skilled in the art, without departing from the spirit and scope of the appended claims.

I claim:

1. In a system wherein a rod is linearly movable along its axis, the improvement comprising mechanism for locking said rod in selected positions of adjustment: said locking mechanism comprising a rigid housing having opposed walls (30 and 32), each wall having an opening (28) therein designed to have the aforementioned rod pass freely therethrough; an annular rod-gripper means mounted in each said opening in each said wall; means for admitting compressed air from a remote supply into the housing to operate each rod-gripper means between a rod-locked position and a rod-released position; and valve means (18) operable to alternately expose the housing interior space to the compressed air supply or to the atmosphere; each said rod-gripper means comprising an annular elastomeric member that includes an annular plug section having an annular groove in its outer surface receivable around the edge of the associated wall opening, an axially elongated cylindrical sleeve section of lesser outside diameter than said plug section, and an annular tapered neck section joining the plug section and the sleeve section; the inner diameter of each sleeve section being less than the rod diameter when each elastomeric member is initially formed, whereby the sleeve section normally tightly grips the rod surface to lock the rod against linear motion; each plug section having an inner diameter that is substantially greater than the rod diameter whereby each plug section and associated neck section form a pressurizable chamber (25) around the rod surface; each sleeve section having a substantial axial dimension for extensive area gripment on and along the rod surface; each sleeve section being thin enough in the radial direction that compressed air within the associated pressurizable chamber is able to move into the interface between the rod and sleeve section, thereby expanding the sleeve section away from the rod surface to release the rod for linear motion; each elastomeric member being arranged on the associated housing wall so that the associated sleeve section is located outwardly from the associated plug section.

* * * * *